United States Patent
Lerouge et al.

(10) Patent No.: US 8,756,435 B2
(45) Date of Patent: Jun. 17, 2014

(54) OBFUSCATION OF CONTROL FLOW OF SOFTWARE

(71) Applicant: Apple Inc, Cupertino, CA (US)

(72) Inventors: Julien Lerouge, San Jose, CA (US); Jonathan G. McLachlan, San Francisco, CA (US); Daniel F. Reynaud, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/656,379

(22) Filed: Oct. 19, 2012

(65) Prior Publication Data

US 2013/0232323 A1    Sep. 5, 2013

Related U.S. Application Data

(60) Provisional application No. 61/606,236, filed on Mar. 2, 2012.

(51) Int. Cl.
G06F 9/38 (2006.01)
G06F 21/00 (2013.01)

(52) U.S. Cl.
USPC .......................................... 713/190; 726/26

(58) Field of Classification Search
USPC ................................ 713/190, 188; 726/25, 26
See application file for complete search history.

(56) References Cited

U.S. PATENT DOCUMENTS

| | | |
|---|---|---|
| 7,779,270 B2 | 8/2010 | Horning et al. |
| 2007/0234070 A1 | 10/2007 | Horning et al. |
| 2009/0235089 A1* | 9/2009 | Ciet et al. .................. 713/190 |
| 2010/0199354 A1* | 8/2010 | Eker et al. .................. 726/26 |
| 2010/0332759 A1 | 12/2010 | Vauclair |
| 2011/0138351 A1 | 6/2011 | Monsifrot et al. |
| 2011/0167414 A1 | 7/2011 | Lattner et al. |
| 2011/0283115 A1 | 11/2011 | Junod |

FOREIGN PATENT DOCUMENTS

KR    10-2010-0113269    10/2010

OTHER PUBLICATIONS

Linn et al. Obfuscation of Executable Code to Improve Resistance to Static Disassembly, Oct. 27-31, 2003, Department of Computer Science University of Arizona, pp. 290-299.*

* cited by examiner

Primary Examiner — Jeffrey Pwu
Assistant Examiner — Samuel Ambaye
(74) Attorney, Agent, or Firm — Blakely, Sokoloff, Taylor & Zafman LLP

(57) ABSTRACT

Methods, media and systems that obfuscate control flow in software programs. The obfuscation can impede or prevent static flow analysis of a software program's control flow. In one embodiment, a method, performed by a data processing system, identifies each branch point in a set of branch points in a first version of software and replaces, in each branch point in the set, a representation of a target of the branch point with a computed value that depends upon at least one prior computed value in a stream of instructions in the first version of software. Other embodiments are also described.

14 Claims, 8 Drawing Sheets

OBFUSCATION OF CONTROL FLOW OF SOFTWARE

CROSS-REFERENCE TO RELATED APPLICATIONS

This application claims the benefit of U.S. Provisional Application No. 61/606,236, filed Mar. 2, 2012, which is hereby incorporated by reference.

BACKGROUND OF THE INVENTION

The present invention relates to computer security and in particular to techniques for preventing the reverse engineering and/or other forms of attack on computer software.

Disassembling and mapping the flow of control between blocks of instructions in a computer program is by far the most common and easiest way for an attacker to reverse engineer and gain an understanding of the inner workings of a computer program. The mapping of the flow of control can produce a static control flow graph. In order to obtain this static control flow graph which shows the mapping of the flow of control between blocks, a disassembler has to perform two fundamental operations: (1) for each byte in the binary code, decide if this byte is part of an instruction or data and (2) map the flow of control between instructions. Techniques which impede or prevent this procedure can be used to prevent the reverse engineering of the software program. U.S. Pat. No. 7,779,270 describes an approach to obfuscate a computer program in a manner which impedes or prevents reverse engineering of the computer program.

SUMMARY OF THE DESCRIPTION

The obfuscation of the control flow of computer software can be obtained by using one or more of the embodiments described herein. In one embodiment, a method for obfuscating the control flow includes receiving a first version of software and identifying each branch point in a set of branch points in the first version of software and then replacing, in each branch point in the set, a representation of a target of the branch point with a computed value that depends upon at least one prior computed value in a stream of instructions in the first version of software. The at least one prior computed value can be from a prior branch point in the set of branch points in the stream of instructions. In one embodiment, all of the branch points in a particular set of branch points can modify a variable during the execution of the program in order to create computed values for each branch point such that the computed value for a particular branch point depends upon all of the prior computed values for the prior branch points. By updating the variable throughout the program and by taking into account previous values, it becomes more difficult to reverse engineer the flow of control between blocks. In one embodiment, the first version of software is an intermediate representation of a high level source code description of the software, wherein this first version is generated by a compiler. The target of the branch point in the first version of the software before it is replaced can be specified by one of: (a) a call name; (b) a function name; or (c) a logical address or pointer, etc. In one embodiment, the target can be specified, after the replacing operation, by an entry in a jump table that uses the computed value in a branch point as an index into the jump table. The target, after the replacing, can be stored as a masked target in an entry in the jump table that uses the computed value as an index, and the target is revealed at run time of the software by an unmasking of the masked target.

In one embodiment, a method according to the present invention can also include the addition of non-executed code at the beginning of a target of at least one of the branch points in the set of targets. This non-executed code can be referred to as "fake" code but in fact in one embodiment it can have the same binary opcodes as executed or "real" code. In one embodiment, the non-executed code is selected so that it is statistically matched with or based on the executed code as described herein.

The methods of the present invention can be used to create software according to one or more embodiments described herein. Also, certain embodiments of the present invention also include software programs created by these one or more methods. Such computer software will compute, in one embodiment, at each branch point in the set of branch points, a branch point value that depends upon prior computed branch point values in the obfuscated software program. In one embodiment the software program can also retrieve, using the branch point value a target or masked target from a jump table. Further, the software program can also include "fake" code inserted into the beginning of a target of a branch.

Embodiments of the present invention also include machine readable non-transitory storage media containing executable instructions which when executed cause the data processing system to perform any one of the methods described herein.

Other features of the present invention will be apparent from the accompanying drawings and from the detailed description which follows.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1A:
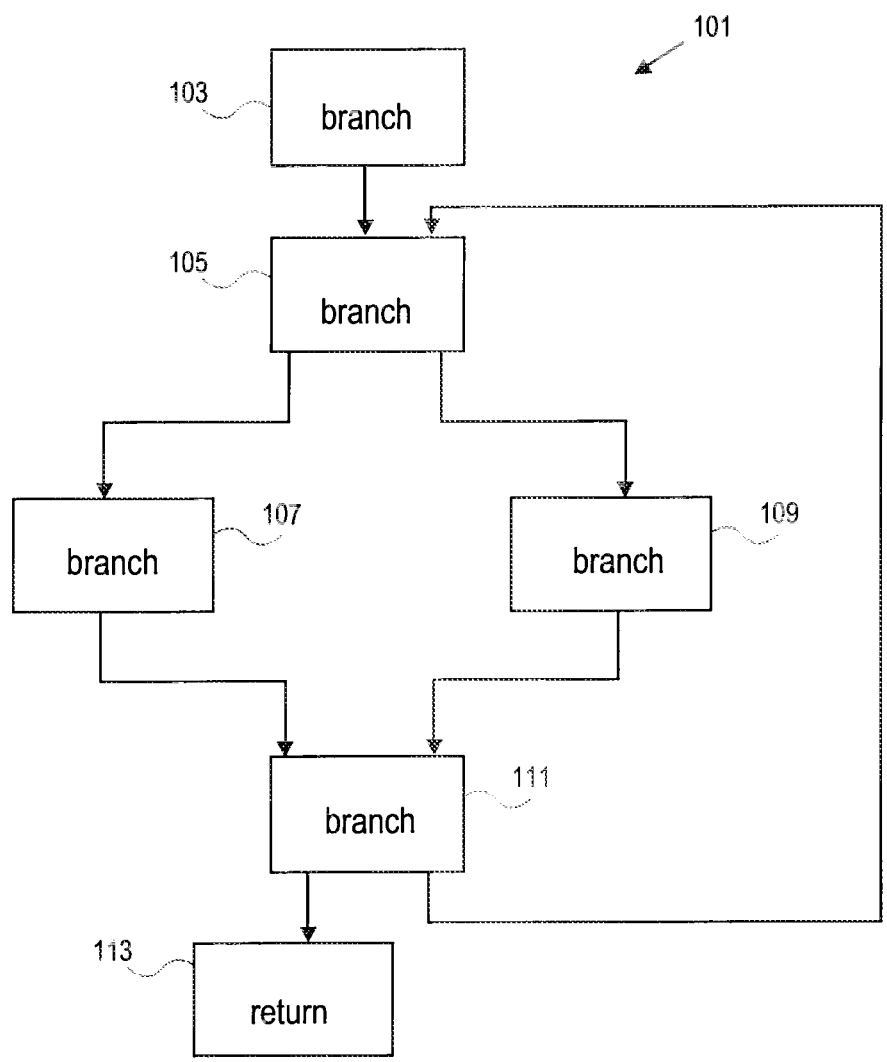
FIG. 1A shows an example of an initial version of a software program having at least two branches between blocks of instructions.
Figure 1B:
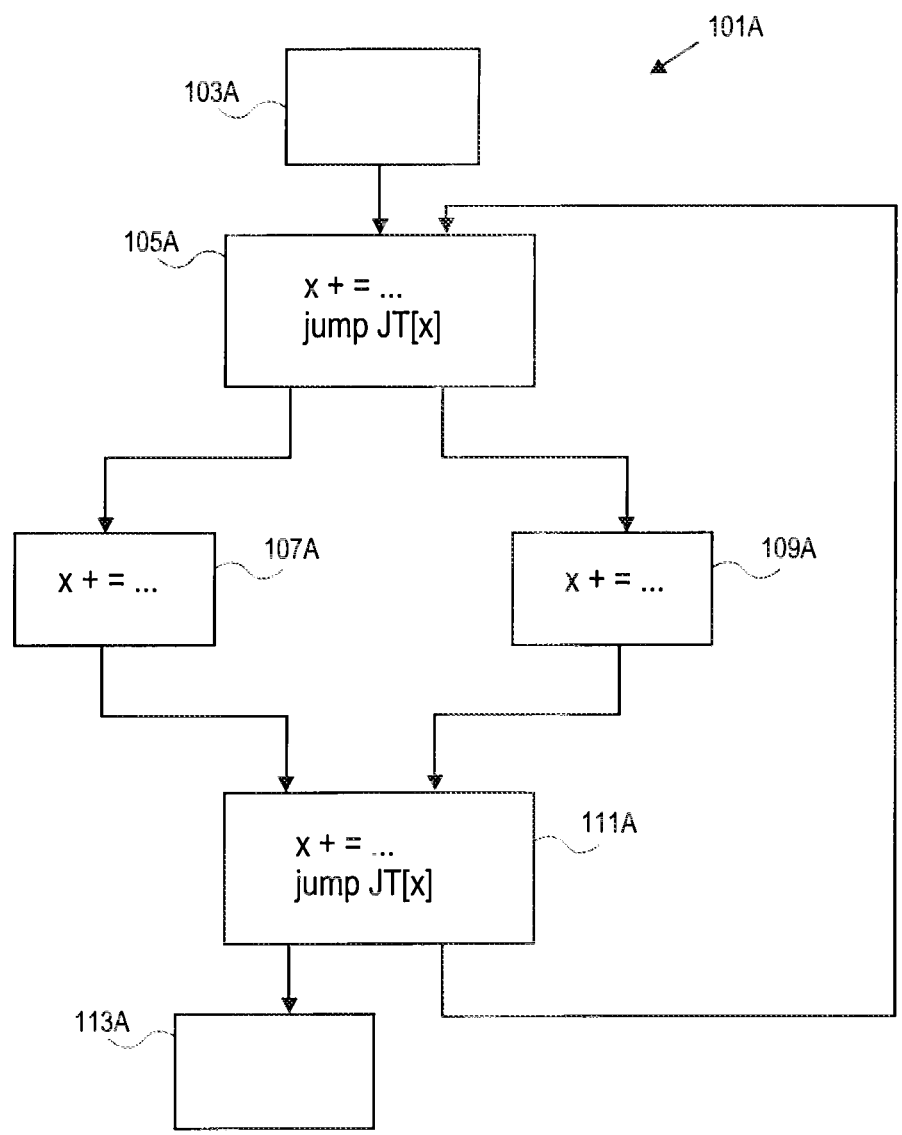
FIG. 1B shows an example of a software program after a representation of a target at a branch point has been replaced with a computed value according to one embodiment of the present invention.
Figure 7:
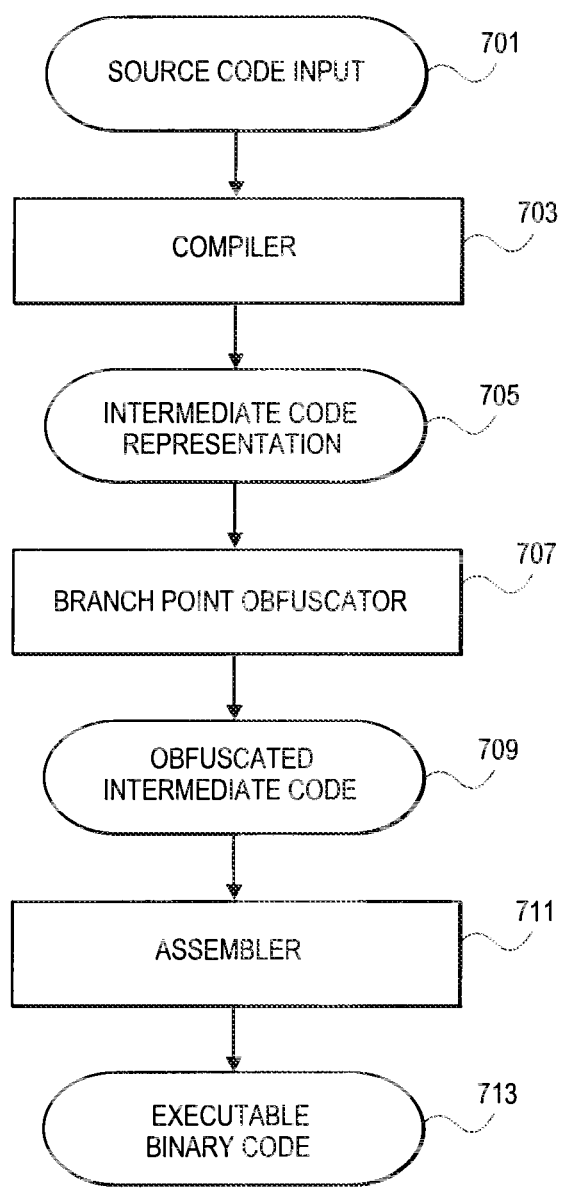
FIG. 7 shows an example of software components which can be used with an inputted source code according to one embodiment of the present invention in order to obfuscate executable code.

FIG. 1A shows an example of a software program which includes at least two branch points 105 and 111 in the flow of blocks of instructions. In one embodiment, each block of instruction may represent a self contained function in C or C++. In one embodiment, blocks 103 and 107 and 109 can contain branches, and block 103 can represent an entry point or the beginning of a software program. Block 113 can represent a return from a function or other software program to provide a result to another software program or block of instructions. The software program 101 represented in FIG. 1A can be in an intermediate code representation which results from an initial compilation by a compiler, such as a compiler 703 shown in FIG. 7. One or more methods as described herein can then be performed upon the software program 101 to produce a modified or obfuscated software program 101A in which a representation of a target at each branch point in a set of branch points is replaced with a computed value that can depend upon at least one prior computed value in the stream of instructions in the software. For example, the at least one prior computed value can be from a prior branch point in the stream of instructions. As shown in FIG. 1B, software program 101 has been modified by replacing the targets in blocks 105 and 111 with computed values based upon a variable x, and this variable is updated through the program's execution (x+= . . . ) as shown in blocks 105A, 107A, 109A, and 111A. In the embodiment shown in FIG. 1B, a jump table is used to store the address or other pointer values or labels of the target, and the computed value is used as an index into that table to look up the corresponding address for a particular branch point. It will be understood that software program 101A is shown as a sequence of lines of code and that each block can contain a sequence of the lines of code or a function within each block. If blocks 103A and 107A and 109A contain branch points, then the branch points in those blocks can also be modified or replaced with computed values. In one embodiment, every branch point in a software program can be modified by replacing a representation of the target with a computed value as described herein. In this case, the set of branch points is all of the branch points in the software program. In another embodiment, only some of the branch points in a software program are modified by replacing a representation of a target with a computed value.

Figure 2:
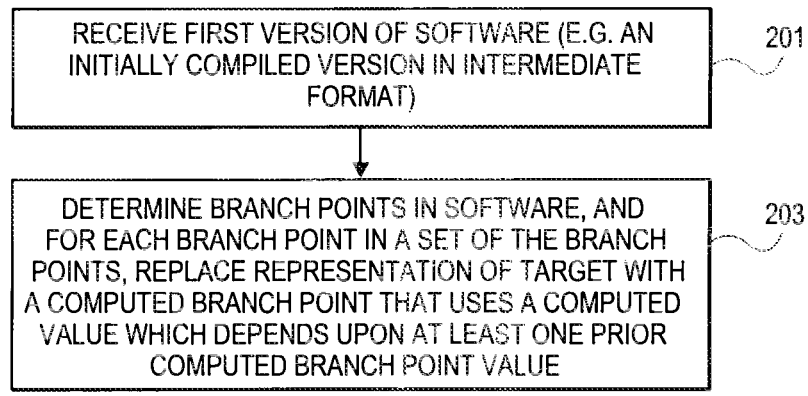
FIG. 2 is a flowchart illustrating a method according to one embodiment of the present invention.

A method for obfuscating a software program is shown in FIG. 2. In operation 201 a first version of the software is received by an obfuscator such as obfuscator 107 in FIG. 7. The first version of the software can be an initially compiled version of the software program in an intermediate code representation such as intermediate code representation 705 shown in FIG. 7. This representation can be created by a compiler 703 which receives a source code input 701 in a high level language such as C or C++. In operation 203 an obfuscator, such as obfuscator 707 can determine branch points in the software, and for each branch point in a set of branch points, replace a representation of a target with a computed branch point value that uses a computed value that depends upon at least one prior computed branch point value. For example, as shown in FIG. 1B, the value of x is modified during the computation by adding some value to x as shown in blocks 105A, 107A, 109A, and 111A. Hence, operation 203 can be used to introduce computed values into each branch point in a set of branch points in order to replace a representation of a target with a computed branch point value.

In another embodiment, an obfuscator can process specified portions of code with a greater level of obfuscation than unspecified portions of code. In one embodiment, levels of obfuscation are implemented by adding or removing a combination of one or more of: amount of fake code, number of branch points, complexity of encode/decode functions, and masked jump tables. In one embodiment, when minimal code size or minimal code complexity is advantageous (e.g., code executed by portable or low processing power devices), the obfuscator can specify sections of code (e.g., code that executes security or data protection related functions) that can receive more layers of obfuscation while reducing layers of obfuscation from other less critical sections of ode. Selecting specific sections of code for obfuscation can provide for a minimal performance impact when implementing code obfuscation while still providing enhanced protection to specific sections of code. In one embodiment, the source code input 701 contains instructions to automatically trigger varying layers or levels of obfuscation for selected sections of code while other sections can have less obfuscation or no obfuscation.

Figure 3:
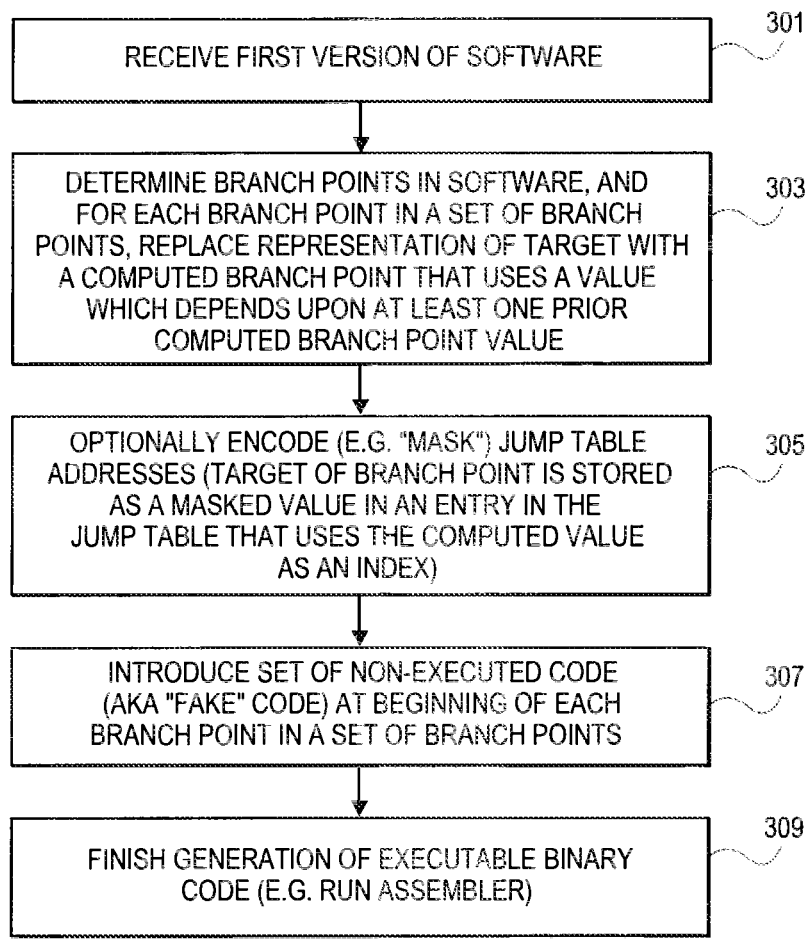
FIG. 3 is a flowchart which also shows a method according to an embodiment of the present invention.
Figure 4:
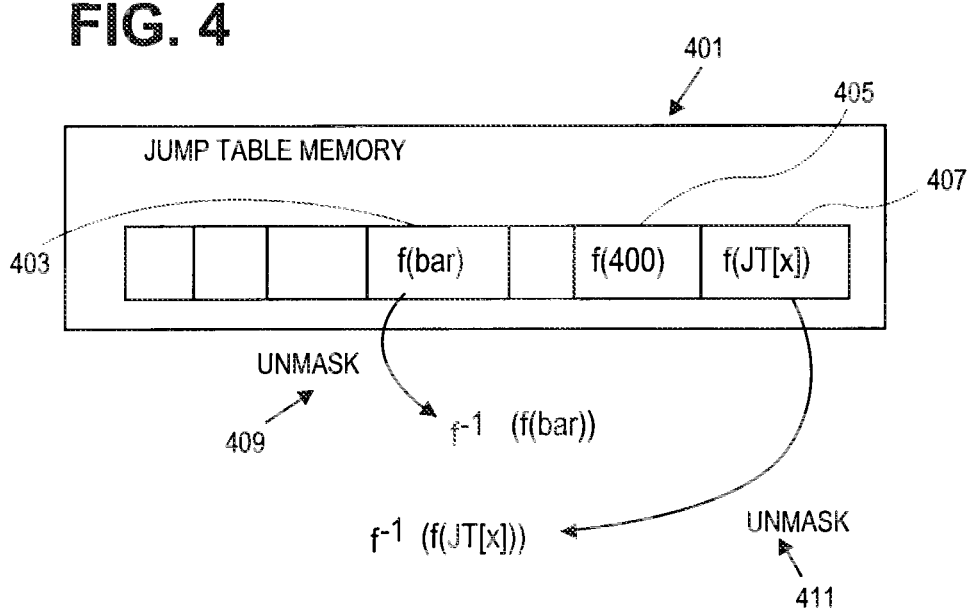
FIG. 4 shows an example of a data structure; for a jump table memory which can be used according to at least one embodiment of the present invention.

FIG. 3 shows another embodiment, which is similar to the method shown in FIG. 2 but in which additional operations can be performed, such as operations 305, 307, and 309. Operation 301 is similar to operation 201 in FIG. 2, and operation 303 in FIG. 3 is similar to operation 203 in FIG. 2. After operation 303, the method can optionally encode, through a mask operation described below, jump table addresses in a jump table. An example of this is shown in FIG. 4 which will be described further below. In this embodiment, the target of a branch point is stored as a masked value in an entry in the jump table that uses the computed value at the branch point as an index into the jump table to retrieve the corresponding masked value. In operation 307, the obfuscator, such as obfuscator 707 can introduce a set of non-executed code (also known as "fake" code) at the beginning of each branch point in a set of branch points. The number of lines of this fake code can vary, and in one embodiment the byte values used for the "fake" code can be made to statistically resemble byte values of the real code as is explained further below in connection with FIG. 6. The introduction of non-executed code can result in the structure of the code shown in FIG. 5, which will be explained further below. After operation 307, the resulting obfuscating software program can be provided to an assembler, such as assembler 711 shown in FIG. 7 which can generate executable binary code 713. In one embodiment, an assembler 711 performs the operation 309 on the obfuscated intermediate code 709 to produce the final executable binary code.

FIG. 4 shows an example of a jump table data structure in memory when the obfuscated software program is being executed at run time of that software program. The jump table memory stores encoded or masked target values which are decoded or unmasked at run time in order to determine the actual target for a jump or branch point. Jump table memory 401 can be stored in heap memory for the software program and can have encoded or masked function calls, such as masked function calls 403 and 405 or masked jump pointers or addresses such as masked pointer 407 which are unmasked as shown in operations 409 and 411 to reveal the unmasked target used for the next jump in the execution of the program.

Figure 5:
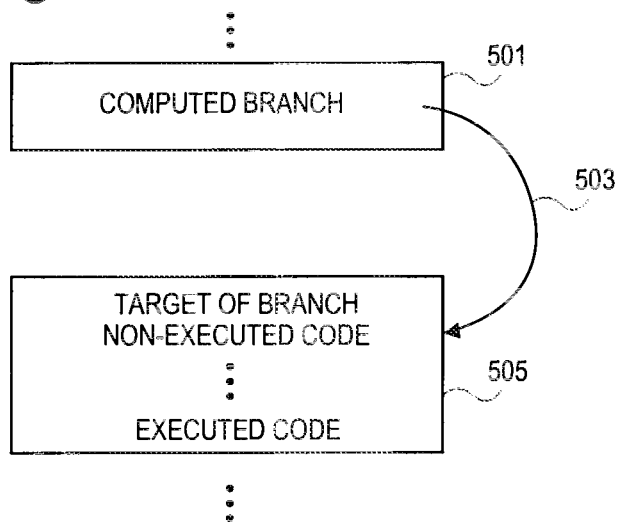
FIG. 5 shows an example of an embodiment in which non-executed code is inserted into a software program according to an embodiment of the present invention.
Figure 6:
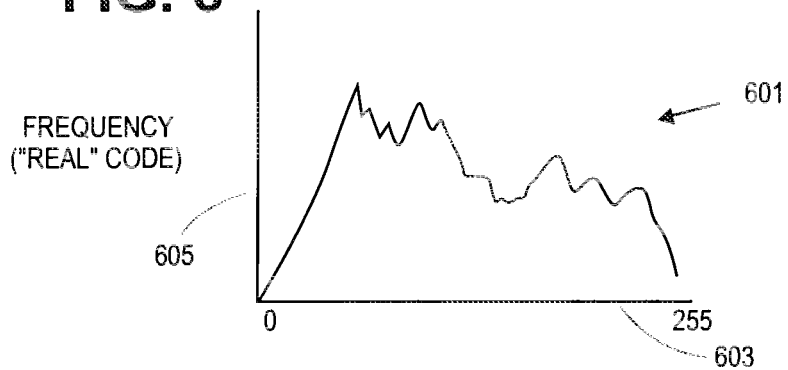
FIG. 6 is a graph showing a frequency of the byte values in real code which is executed in a software program.

FIG. 5 shows an example of a portion of an obfuscated software program according to one embodiment of the present invention in which non-executed code (also known as "fake" code) has been introduced into the code. The software program has been obfuscated by using a computed branch at branch point 501 which causes the branching through operation 503 to the target of the branch. Non-executed code is introduced at block 505 at the beginning of the block 505. The amount of non-executed code can be randomly varied in different blocks in one embodiment. The non-executed code in one embodiment can be created so that it is statistically similar to real executed code by assuring the pattern of byte values selected for the fake code matches the frequency of byte values used in real code. This is shown further in FIG. 6 which shows a graph 601 depicting the frequency on axis 605 of byte values from 0 to 255 as shown on axis 603. In one embodiment, the fake code can include actual byte values used in the real code which are executed. For example, one or more bytes can be copied automatically by the obfuscator from one or more bytes of real code from other sections of the program and inserted before a branch or jump.

Figure 8:
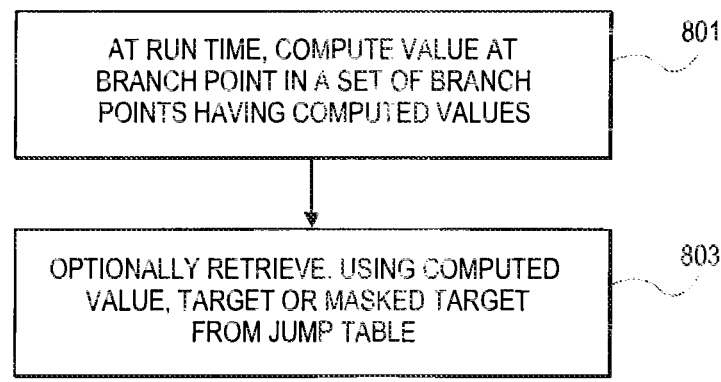
FIG. 8 is a flowchart illustrating the operation, at run time, of an obfuscated software program which has been obfuscated according to one or more embodiments described herein.

FIG. 8 shows an example of a method which is performed at run time by the obfuscated software program, such as the executable binary code 713 which results from using one or more methods described herein. In operation 801 the obfuscated software program computes a value at a branch point in a set of branch points having computed values, and this computed value is used to derive the target for a jump or other branch within the execution of the program. In operation 803, the software program can optionally retrieve, using the computed value, a target or masked target from a jump table, such as jump table 401 shown in FIG. 4.

The following pseudo code example shows an embodiment in which an initial program is modified to add computed branch values according to one embodiment of the present invention.

The following is a program that computes the Fibonacci number n:

```
function fibo(n) {
    result = n
```

```
    if (n <= 1)
        goto exit
    else
        goto compute
    compute:
        result = fibo(n − 1) + fibo(n − 2)
        goto exit
    exit:
        return result
}
```

This algorithm takes 4 parameters:
mask and unmask, two inverse functions such that for any x, unmask(mask(x))==x.
encode and decode, two functions such that:

$$encode(x,y)==k$$

$$decode(k,y)==y$$

Given the knowledge of x, they are used to conceal a parameter y and pass it as an encoded value k. Let JumpTable be a global array and i and j be indices into this array such that:

$$JumpTable[i]{=}f(compute) \text{ and } JumpTable[j]{=}f(exit)$$

The example program protected with an embodiment of algorithm described herein would be:

```
JumpTable = [ . . . , mask(compute), . . . , mask(exit), . . . ]
function fibo(n, x) {
    index = decode(x, 4)
    result = n
    if (n <= 1)
        index = decode(index, i)
    else
        index = decode(index, j)
    goto unmask(JumpTable[index])
compute:
    result = fibo(n − 1, encode(index, 4)) + fibo(n − 2, encode(index, 4))
    index = decode(index, i, j)
    goto unmask(JumpTable[index])
exit:
    return result
}
```

A non-trivial decode function uses a computation based on k, so that tampering with k yields a different result, and the value of k has to be known to discovery. For instance, for decode (x=56, 12) we could use:

$$y=x-44$$

or $$y=x\%22.$$

Encode may use random inputs, such that two runs of encode (x, y) may return distinct values. The index used to select the address of the next block in the JumpTable can always be updated with the following pattern:

$$index=decode(index, \dots)$$

This means to discover the successor(s) of the current block, an attacker needs to know at least one predecessor of the current block. This example does not use the insertion of the garbage data ("fake" code) that looks like code. Fake code, if added in this example would make it unclear exactly where the compute label is and where the exit label is. Unmask and mask work similarly to encode and decode, but do not require prior knowledge of the value to be masked, because the masked value may change when the program is loaded in memory, during relocation. Also, the mask function can be chosen carefully to let the dynamic loader operate on the masked values.

Figure 9:
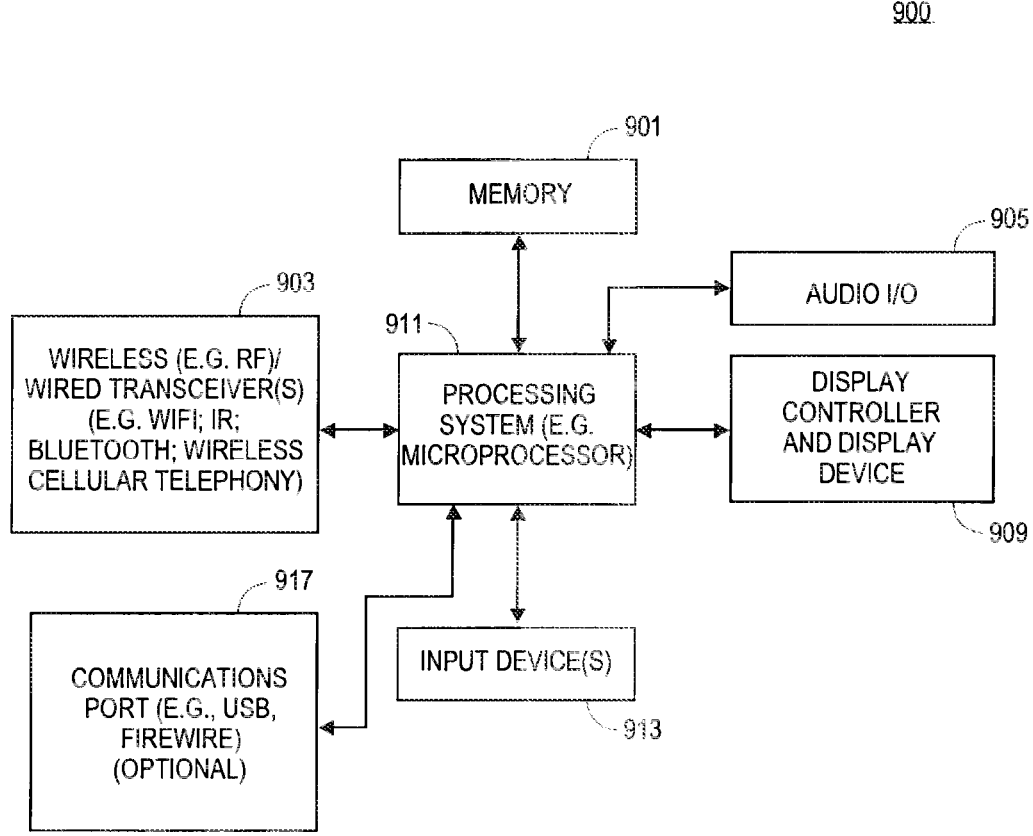
FIG. 9 shows an example of a data processing system which can be used with one or more embodiments described herein.

FIG. 9 shows an example of data processing system 900 which may be used with one embodiment of the present invention. For example and in one embodiment, system 900 may be implemented as a portable data processing device such as a smartphone or tablet (e.g., iPad) device or a laptop or an entertainment system. The data processing system 900 shown in FIG. 9 includes a processing system 911, which may be one or more microprocessors or which may be a system on a chip (integrated circuit) and the system also includes memory 901 for storing data and programs for execution by the processing system. The memory 901 can store, for example, the software components described in conjunction with FIGS. 1A and 1B and memory 901 can be any known form of a machine readable non-transitory storage medium, such as semiconductor memory (e.g., flash; DRAM; SRAM; etc.) The system 900 also includes an audio input/output subsystem 905 which may include a microphone and a speaker for, for example, playing back music or providing telephone functionality through the speaker and microphone.

A display controller and display device 909 can provide a visual user interface for the user; this interface may include a graphical user interface which is similar to that shown on a Macintosh computer when running OS X operating system software or iOS software on an iPhone or iPad. The system 900 can include one or more wireless transceivers 903 to communicate with another data processing system. A wireless transceiver may be a WLAN transceiver (e.g. WiFi), an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system. The system 900 further can include one or more communications ports 917 to communicate with another data processing system. The communications port may be a USB port, Firewire port, Bluetooth interface, a docking port, etc.

The data processing system 900 also can include one or more input devices 913 which are provided to allow a user to provide input to the system. These input devices may be a keypad or a keyboard or a touch panel or a multi-touch panel which is overlaid and integrated with a display device such as display device 909. The data processing system 900 can also include an optional input/output device which may be a connector for a dock. It will be appreciated that one or more buses, not shown, may be used to interconnect the various components as is well known in the art. The data processing system shown in FIG. 9 may be a desktop computer, a handheld computer or a personal digital assistant (PDA), or a cellular telephone with FDA-like functionality, or a handheld computer which includes a cellular telephone, or a media player, such as an iPod, or a game or entertainment device, or devices which combine aspects or functions of these devices, such as a media player combined with a PDA and a cellular telephone in one device or an embedded device or other consumer electronic devices. In other embodiments, the data processing system 900 may be a network computer or an embedded processing device within another device, or other types of data processing systems which have fewer components or perhaps more components than that shown in FIG. 9.

Data processing system 900 can optionally include one or more hardware devices designed to digitize and store human speech received by the microphone in Audio I/O 905.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures. Moreover, the software which is obfuscated using one or more embodiments described herein can be software that is used to play the music or motion pictures or other content.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine readable non-transitory storage medium containing executable instructions which when executed cause a data processing system to perform a method comprising:
receiving a first version of software;
identifying each branch point in a set of branch points in the first version of software; and
replacing, in each branch point in the set, a representation of a target of the branch point with a computed value that depends upon at least one prior computed value in a stream of instructions in the first version of software, wherein the at least one prior computed value is from a prior branch point in the set of branch points in the stream of instructions, the first version of software is an intermediate representation of a high level source code description of the software; and the target, before the replacing, is specified by one of a call name, a function name, a logical address, or a pointer.

2. The medium as in claim 1 wherein the target is specified, after the replacing, by an entry in a jump table that uses the computed value as an index into the jump table.

3. The medium as in claim 1 wherein the computed value is based on a variable that is calculated at the branch point.

4. The medium as in claim 1 wherein the target, after the replacing, is stored as a masked target in an entry in a jump table that uses the computed value as an index and the target is revealed at run time of the software by an unmasking of the masked target.

5. The medium as in claim 1, wherein the method further comprises: adding non-executed code at a beginning of a target of at least one of the branch points in the set of branch points.

6. The medium as in claim 5 wherein the non-executed code is statistically based on executed code.

7. A machine implemented method comprising:
receiving a first version of software;
identifying each branch point in a set of branch points in the first version of software; and replacing, in each branch point in the set, a representation of a target of the branch point with a computed value that depends upon at least one prior computed value in a stream of instructions in the first version of software, wherein the at least one prior computed value is from a prior branch point in the set of branch points in the stream of instructions, the first version of software is an intermediate representation of a high level source code description of the software; and the target, before the replacing, is specified by one of a call name, a function name, a logical address, or a pointer.

8. The method as in claim 7 wherein the target is specified, after the replacing, by an entry in a jump table that uses the computed value as an index into the jump table.

9. The method as in claim 7 wherein the computed value is based on a variable that is calculated at the branch point.

10. The method as in claim 7 wherein the target, after the replacing, is stored as a masked target in an entry in a jump table that uses the computed value as an index and the target is revealed at run time of the software by an unmasking of the masked target.

11. The method as in claim 7, wherein the method further comprises: adding non-executed code at a beginning of a target of at least one of the branch points in the set of branch points.

12. The method as in claim 11 wherein the non-executed code is statistically based on executed code.

13. A data processing system which obfuscates software comprising:
means for receiving a first version of software;
means for identifying each branch point in a set of branch points in the first version of software;
means for replacing, in each branch point in the set, a representation of a target of the branch point with a computed value that depends upon at least one prior computed value in a stream of instructions in the first version of software;
wherein the at least one prior computed value is from a prior branch point in the set of branch points in the stream of instructions;
wherein the first version of software is an intermediate representation of a high level source code description of the software; and
wherein the target, before the replacing, is specified by one of a call name, a function name, a logical address, or a pointer.

14. A machine readable non-transitory storage medium containing executable instructions which when executed cause a data processing system to perform a method comprising:
computing, at each branch point in a set of branch points, a branch point value that depends upon prior computed branch point values in an obfuscated software program, the computing being by the obfuscated software program at run time of the obfuscated software program; and
retrieving, using the branch point value, a masked target from a jump table that uses the computed value as an index, wherein the target is revealed at run time of the software by an unmasking of the masked target, and wherein the target, before the computing, is specified by one of a call name, a function name, a logical address, or a pointer.

* * * * *